US006456487B1

(12) United States Patent
Hetterick

(10) Patent No.: US 6,456,487 B1
(45) Date of Patent: Sep. 24, 2002

(54) ENCLOSURE FOR WIRELESS COMMUNICATION DEVICE

(75) Inventor: Charlotte Hetterick, San Diego, CA (US)

(73) Assignee: Nokia Corporation, Irving, TX (US)

( * ) Notice: Subject to any disclaimer, the term of this patent is extended or adjusted under 35 U.S.C. 154(b) by 0 days.

(21) Appl. No.: 09/847,882

(22) Filed: Apr. 30, 2001

(51) Int. Cl.⁷ .................................................. G06F 1/16
(52) U.S. Cl. .................... 361/683; 361/679; 361/680; 379/433; 312/223.2
(58) Field of Search ................................ 361/679, 689, 361/683, 686, 682, 725–727, 741, 756, 728, 730, 752, 807, 809, 814; 345/168, 169, 905, 173; 400/691–693; 220/581, 836, 843–848, 811–815, 4.22, 4.23; 312/223.2, 223.3, 208.1, 208.4; 174/17.05, 17.06, 50.5, 50.51, 52.1; 379/433, 434, 420, 429; 181/141, 150, 125, 199, 151; 381/153, 188, 189, 205; 364/708.1; 341/22; 248/917, 309, 688; 206/320; 455/574

(56) References Cited

U.S. PATENT DOCUMENTS

| | | | | |
|---|---|---|---|---|
| 4,845,772 A | * | 7/1989 | Metroka et al. ............... 379/61 |
| 5,335,273 A | * | 8/1994 | Takagi et al. ................. 379/433 |
| 5,673,314 A | * | 9/1997 | Olkoski et al. ............... 379/433 |
| 5,828,012 A | * | 10/1998 | Repolle et al. ............... 181/141 |
| 5,896,453 A | * | 4/1999 | Speaks ........................ 379/433 |
| 5,996,956 A | * | 12/1999 | Shawver ................... 248/309.1 |
| 6,094,565 A | * | 7/2000 | Alberth et al. ................. 455/90 |
| 6,239,968 B1 | * | 5/2001 | Kim ............................ 361/679 |
| 6,313,982 B1 | * | 11/2001 | Hino ........................... 361/679 |
| 6,317,313 B1 | * | 11/2001 | Moskgrove et al. ......... 361/680 |
| 6,365,442 B1 | * | 3/2002 | Lunsford .................... 361/686 |
| 6,384,813 B1 | * | 5/2002 | Narva ......................... 345/175 |

* cited by examiner

Primary Examiner—Darren Schuberg
Assistant Examiner—Michael Datskovsky
(74) Attorney, Agent, or Firm—Milan Patel; Tom Weber

(57) ABSTRACT

A protective enclosure for protecting and enclosing an electronic device. The protective enclosure provides communication capabilities with the electronic device while the electronic device is enclosed and protected by the protective enclosure. The enclosure also provides an alert upon an unsolicited activation of the electronic device and allows the user to communication with electronic device without removing the electronic device from the enclosure.

38 Claims, 6 Drawing Sheets

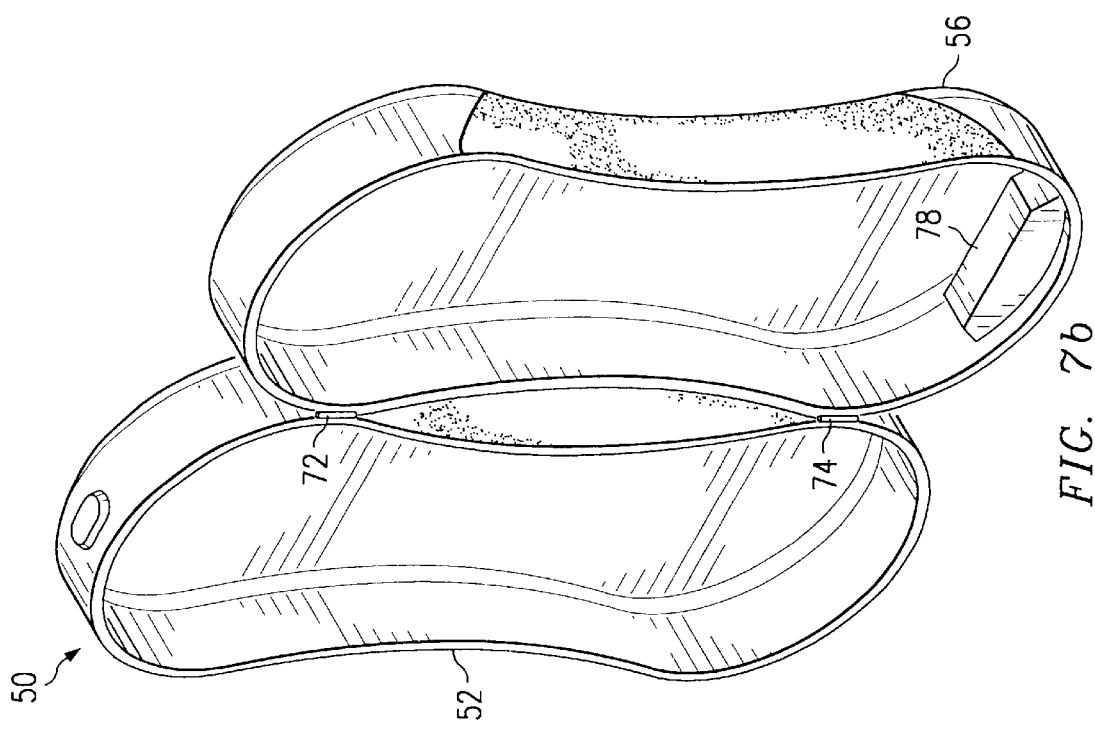
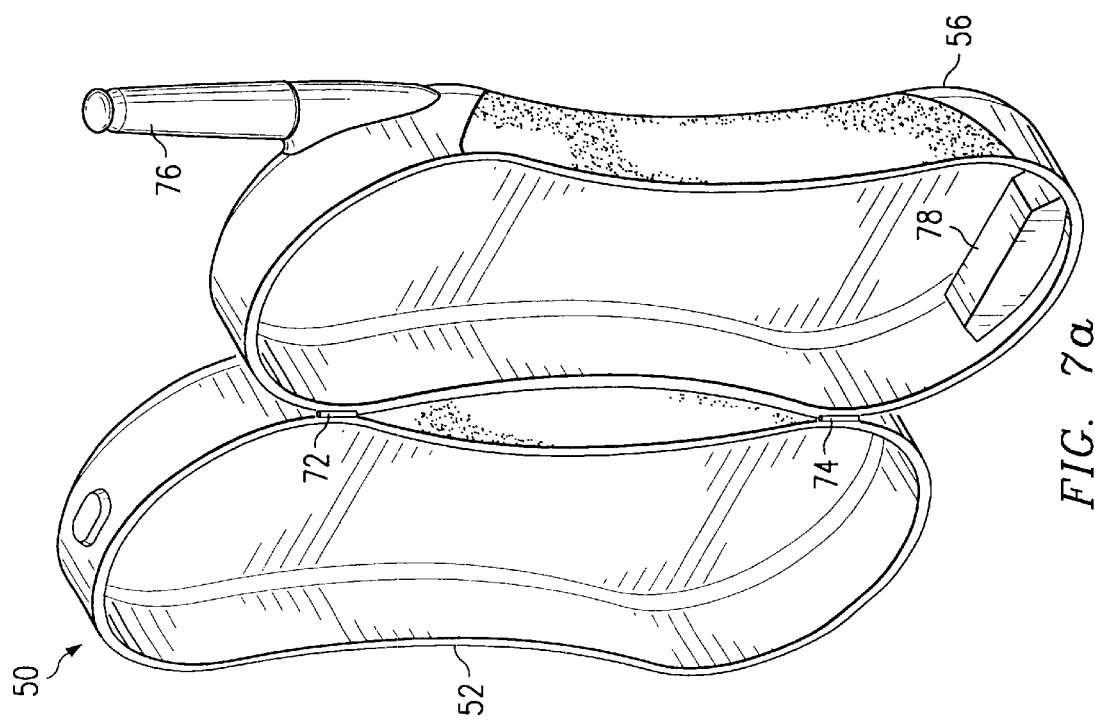

ENCLOSURE FOR WIRELESS COMMUNICATION DEVICE

FIELD OF THE INVENTION

The present invention relates to an apparatus for providing environmental protection for an electronic device, more particularly to an enclosure to provide environmental protection for an electronic device operable in a wireless communication system.

BACKGROUND OF THE INVENTION

A communication system is operable to communicate information between a transmitting station, also referred to as a calling party, and a receiving station, also referred to as a receiving or called party, by way of a communication network. Operation of a wireless communication system transfers information between the transmitting and receiving stations via one or more base stations. These transmitting and receiving stations are also known as wireless communication devices, cell phones or mobile phones, Personal Digital Assistants (PDA's), or portable computers. As the capability and sophistication of the wireless communication system has increased, the proliferation of mobile communication devices has led to widespread use in environments detrimental to the operation of electronics within these devices. Consequently, users are expanding the conditions for using the mobile phone to include the active outdoor activities such as running, hiking, bicycle riding, etc. Protecting the wireless communication device from such demanding conditions is important, as environmental conditions such as high moisture and salinity are likely to reduce reliability of the wireless communication device.

It would be useful to provide a protective barrier, or enclosure, to minimize conditions deleterious to the wireless communication device where the protection offered is effective as a moisture barrier and also operate the communication device while in the enclosure. In addition, the enclosure should be easily attachable and separable from the mobile communication device.

SUMMARY OF THE INVENTION

The present invention encompasses an enclosure to provide environmental protection for an electronic device, such as a mobile station, a personal digital assistant (PDA) or a portable computer. The apparatus of the present invention comprises a protective housing to encapsulate the electronic device, thereby providing environmental protection against the deleterious effects of high moisture, salinity, airborne contaminates such as dust, sand or pollutants. In addition, the enclosure may comprise means for communication with the electronic device, for example to answer an incoming phone call, without having to expose the enclosed electronic device. The enclosure may include a indicator for providing an alert notification of an unsolicited activation of the electronic device.

A more complete appreciation of all the advantages and scope of the present invention can be obtained from the accompanying drawings, the following detailed description of the invention and the appended claims.

BRIEF DESCRIPTION OF THE DRAWINGS

FIG. 7a is a perspective view of an open position of the enclosure having an antenna, as an alternative embodiment of the present invention.

FIG. 7b is a perspective view of an open position of the enclosure of the present invention.

DETAILED DESCRIPTION OF THE INVENTION

Figure 1:
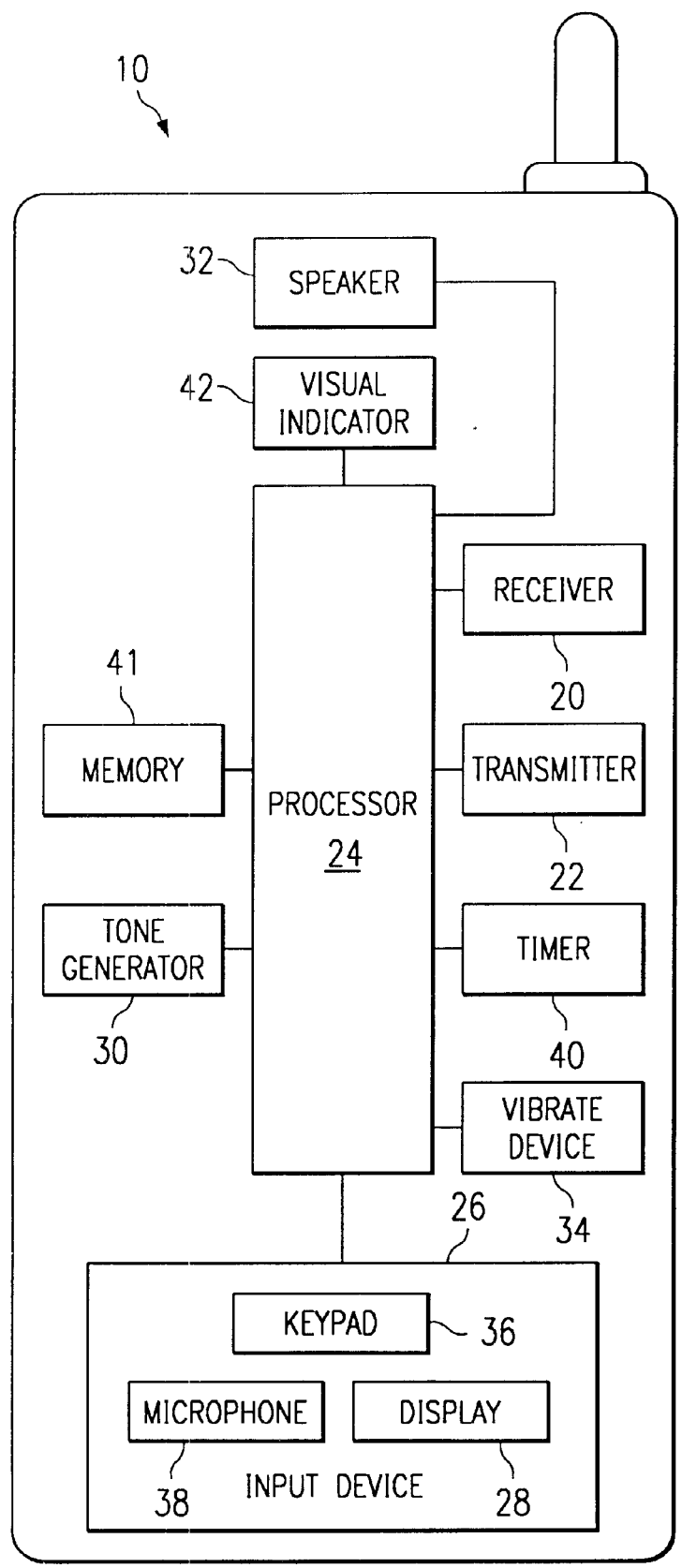
FIG. 1 illustrates a block diagram representing a prior art mobile station.

FIG. 1 is a block diagram representing the prior art, a mobile station 10, where the mobile station 10 can be used in conjunction with an embodiment of the present invention. Generally, the mobile station 10 includes a receiver 20, a transmitter 22 and a controller or processor 24 that is coupled to the receiver 20 and the transmitter 22. The receiver 20 sends incoming messages to the processor 24 for analysis, whereas outgoing or originating messages are sent from the processor 24 to the transmitter 22. These incoming and originating messages can be in the form of a voice message, a data message or a combination of voice and data messages.

User interface with the mobile station 10 can be accomplished via an input device 26 which may comprise: a Liquid Crystal Display (LCD) 28 which can contain a touch-screen display (not shown), or a Light Emitting Diode (LED) (not shown); a tone generator 30; a speaker 32; a vibrating device 34; and a data entry device 36. In a preferred embodiment, the data entry device 36 is an alpha-numeric keypad (not shown) and the input device 26 further contains a microphone 38 capable of capturing a voice message. In addition, a timer 40, also known as a clock chip, can be used for synchronizing the operations of the processor 24 and tracking time, a term well known to those of ordinary skill in the art of mobile stations. Communication between the input device 26, the tone generator 30 and the vibrating device 34 is assured by coupling these devices to the processor 24.

The mobile station 10 also includes a storage location, illustrated in the embodiment of FIG. 1 as a memory 41, where the memory 41 is capable of storing a plurality of constants and variables used by processor 24 in the operation of the mobile station 10. In addition, the memory 41 can store the values of the various feature parameters, operating system used by processor 24, user provided data entered via the input device 36 and sub-programs or sub-processes for controlling the operation of the mobile station 10.

Figure 2:
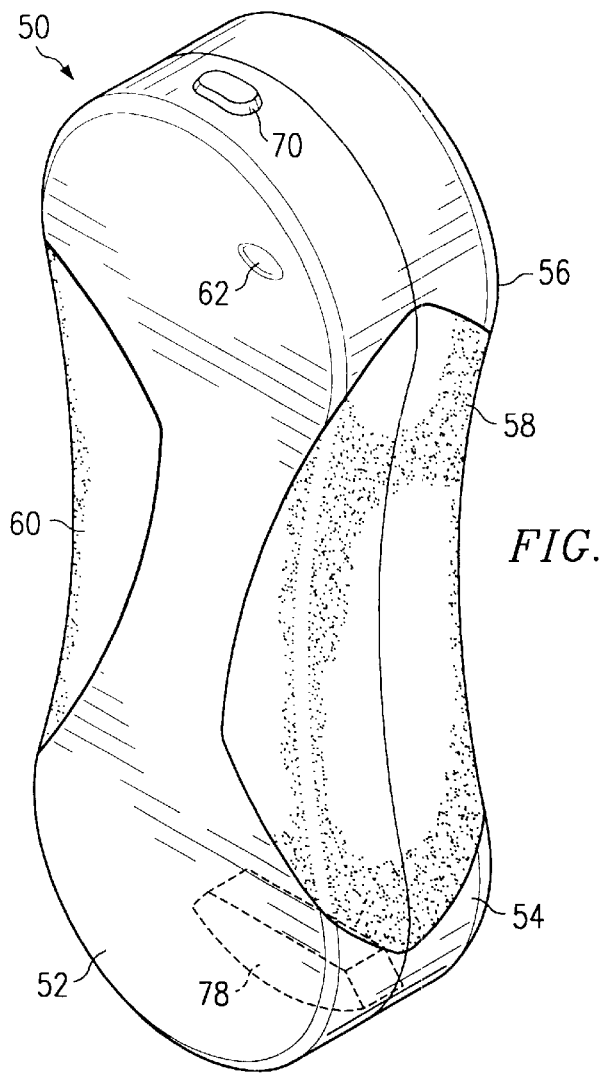
FIG. 2 is a front perspective view of an enclosure illustrating an embodiment of the present invention.

FIG. 2 illustrates a front perspective view of a protective enclosure 50, also called a shell, of an embodiment of the present invention. The protective enclosure 50 contains a front portion 52, a side surface 54, a rear portion 56, a first grip 58, a second grip 60 and an actuator 62. The actuator 62 communicates with an enclosed electronic device that is operable in a wireless communication system, an exemplary electronic device represented by the mobile station 10. In one embodiment, the actuator 62 may comprise a flexible diaphragm on a section of the protective enclosure 50, for example the diaphragm 68 may form a section of the front portion 52 (see FIG. 6) where the user may depress the diaphragm 68 to contact the keypad 36 on the mobile station 10.

An indicator 70 is also provided for indicating activation (such as an incoming call) of the mobile station 10. The indicator 70 provides an alert to the user of an unsolicited activation of the mobile station 10, for example an incoming phone call, whereby the user may activate the actuator 62 (as shown in FIG. 2) to answer the incoming phone call.

The front portion 52 combines with the rear portion 56 to form a housing and provides environmental protection to the electronic device contained therein. The bonding of the front portion 52 with the rear portion 56 may be accomplished using any known mechanical devices such as screws, hinges, clips, snaps, fittings, etc. In other words, any bonding which provides a seal providing at least the level of barrier properties of the front and rear portions, 52 and 56 respectively. The first grip 58 and the second grip 60 can optionally be employed to assist the user in carrying the protective enclosure 50. In an exemplary embodiment, the first and second grip, 58 and 60, may be constructed of a high tactile rubber to provide increased adhesion between the user and the protective enclosure 50. The actuator 62 provides communication between the protective enclosure 50 and the electronic device carried therein. A connector 78 provides a connection between the electronic device and the protective enclosure 50. Specifically, the connector 78 providing a connection for the actuator 62 for controlling preset functionality of the mobile station 10 via the connector 78, such as answering an incoming phone call on the mobile station 10 while the mobile station 10 is enclosed within the protective enclosure 50. The connector 78 also provides a connection for the indicator for displaying an activation of the enclosed electronic device. The connection, generally between the actuator 62 and the mobile station 10 and between the indicator 70 and the mobile station 10, provided by the connector 78 may be a direct connection or a wireless connection. Options for the direct connection include an electrical, a wire, a pin or a serial connection, whereas the wireless connection may comprise a standard defined by Bluetooth technology or an infrared technology. It should be noted that one skilled in the art might use the any wireless technologies and other standards operating using various frequencies without departing from the invention.

Figure 3:
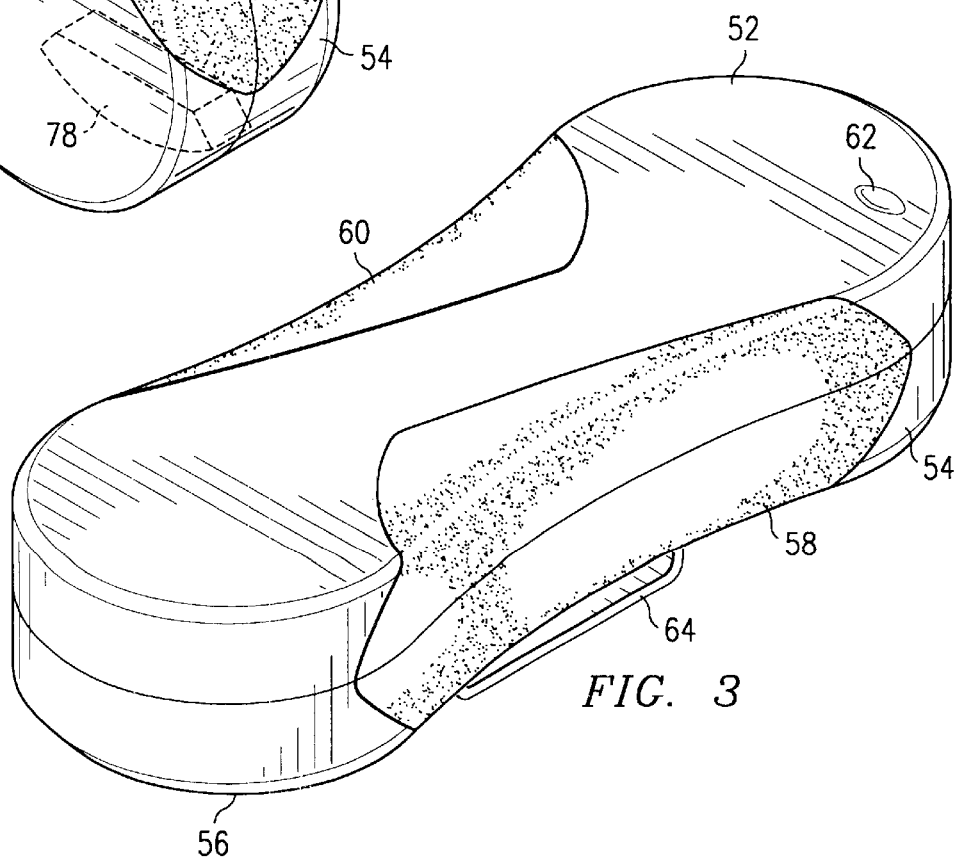
FIG. 3 is a side perspective view of the enclosure illustrating an embodiment of the present invention.
Figure 4:
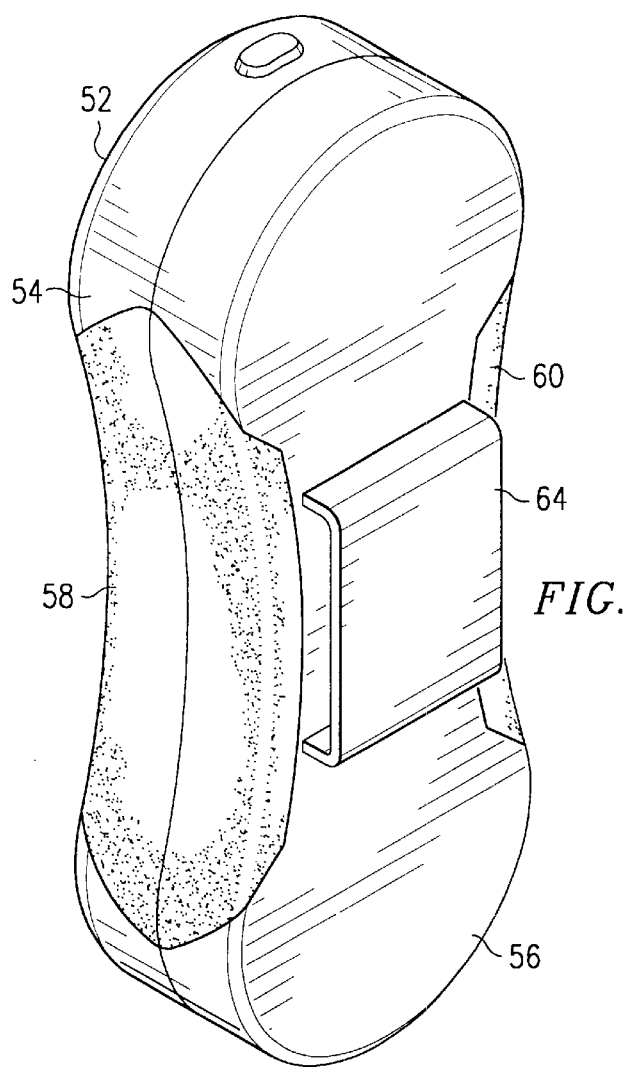
FIG. 4 is a rear perspective view of the enclosure illustrating an embodiment of the present invention.
Figure 5:
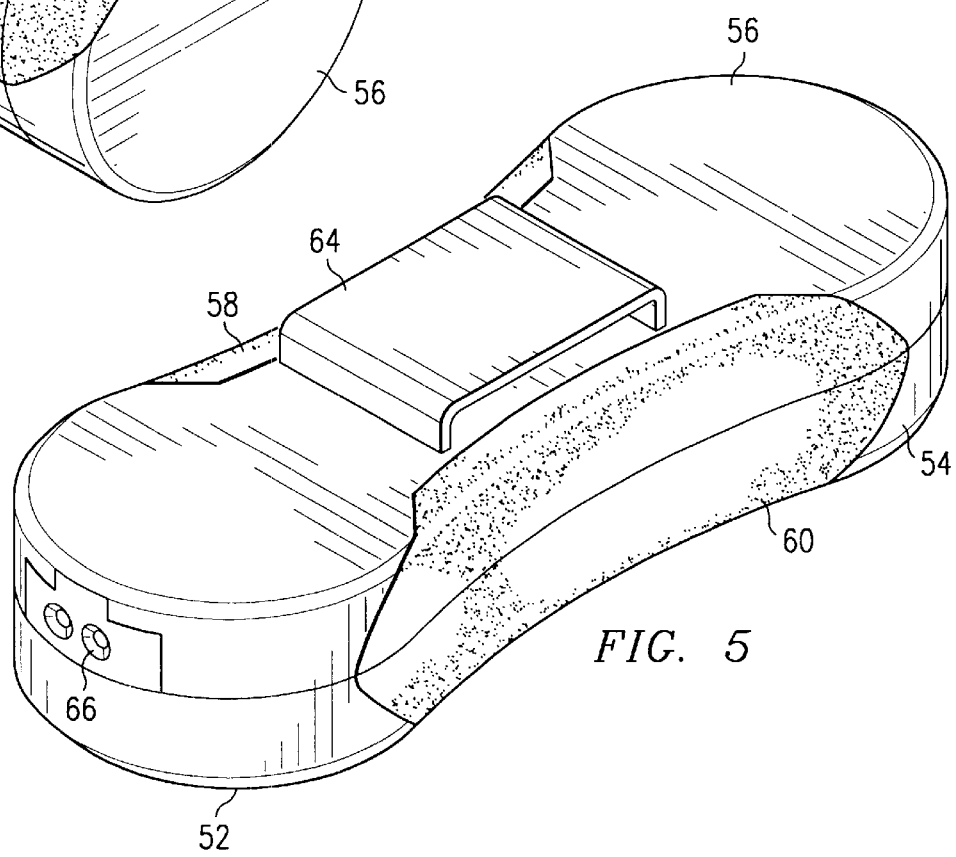
FIG. 5 is a side perspective view of an enclosure illustrating an alternative embodiment of the present invention.

FIGS. 3, 4 and 5 illustrate various perspective views of the protective enclosure 50, including an optional belt loop, or clip 64 to assist the user in attaching the protective enclosure 50 to clothing during outdoor activities such as walking, running, cycling, etc. FIG. 5 additionally illustrates an alternative feature, an access port 66 may be used to connect peripheral units (i.e. charger, headset, battery pack, etc.) to the electronic device contained within the protective enclosure 50.

Figure 6:
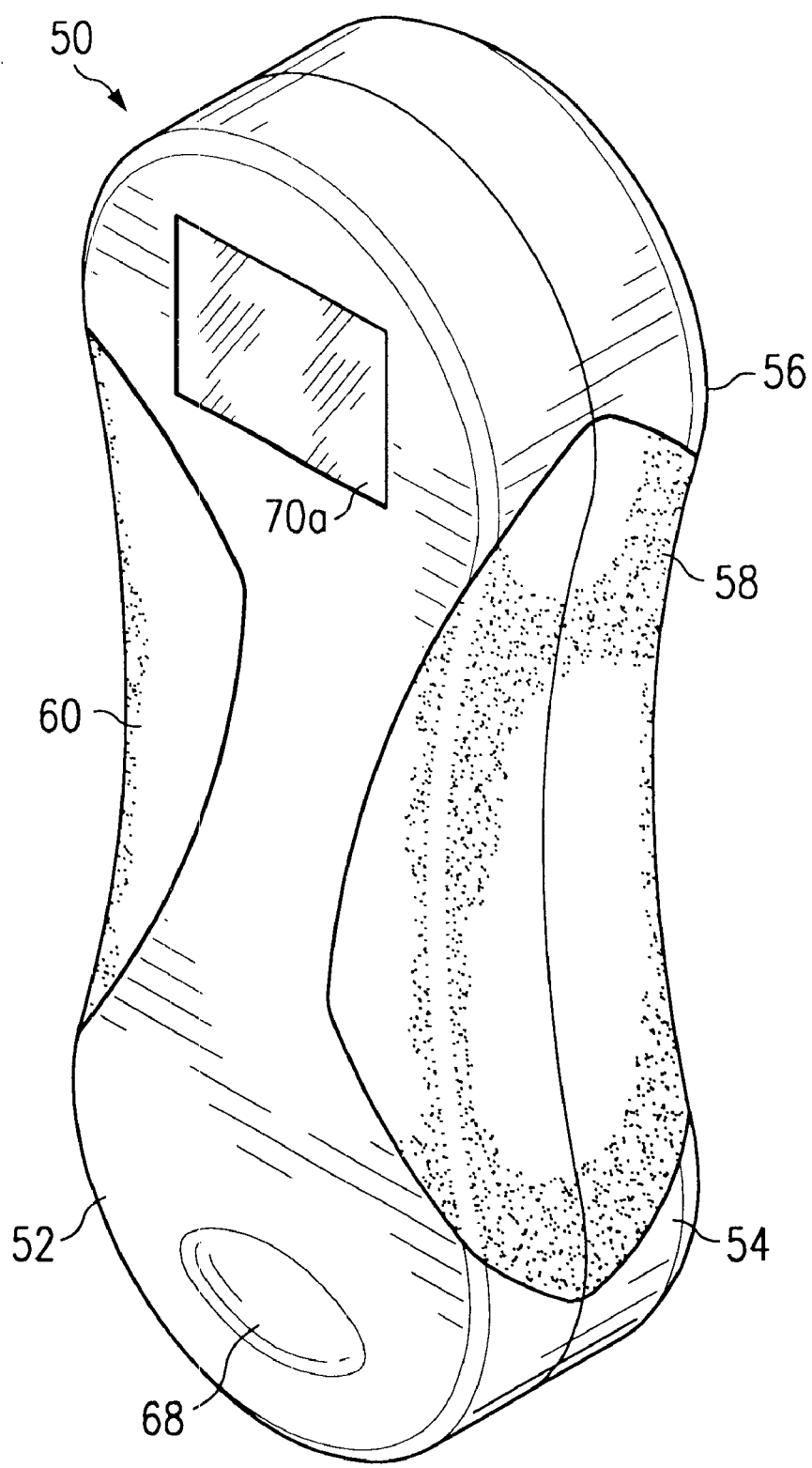
FIG. 6 is a front perspective view of an enclosure illustrating another alternative embodiment of the present invention.

FIG. 6 illustrates a front perspective view of an alternative embodiment of the present invention. The diaphragm 68 is provided to communicate the mobile terminal 10. The diaphragm 68 is generally of a lower flexural modulus than the enclosure 50. Within the alternative embodiment, the indicator 70 comprises a liquid crystal display (LCD) 70a, generally provided at the front portion 52 of the protective enclosure 50. In additional alternative embodiments the indicator 70 may comprise a light emitting diode (LED), an intermittent illumination as the alert, or may comprise a multicolor display capability, with distinct colors representing specific Calling Line Identification (CLI) or Calling Number Identification (CNI) signals.

FIG. 7a illustrates the enclosure 50 in an open position where the front portion 52 and the rear portion 56 are joined at a first hinge 72 and a second hinge 74. Not illustrated is an embodiment having one or more covers to seal the enclosure, where the cover may be mechanically attached to the housing via a threaded fitting, friction fit, screws, hinges, clips, snaps, etc.

Figure 7C:
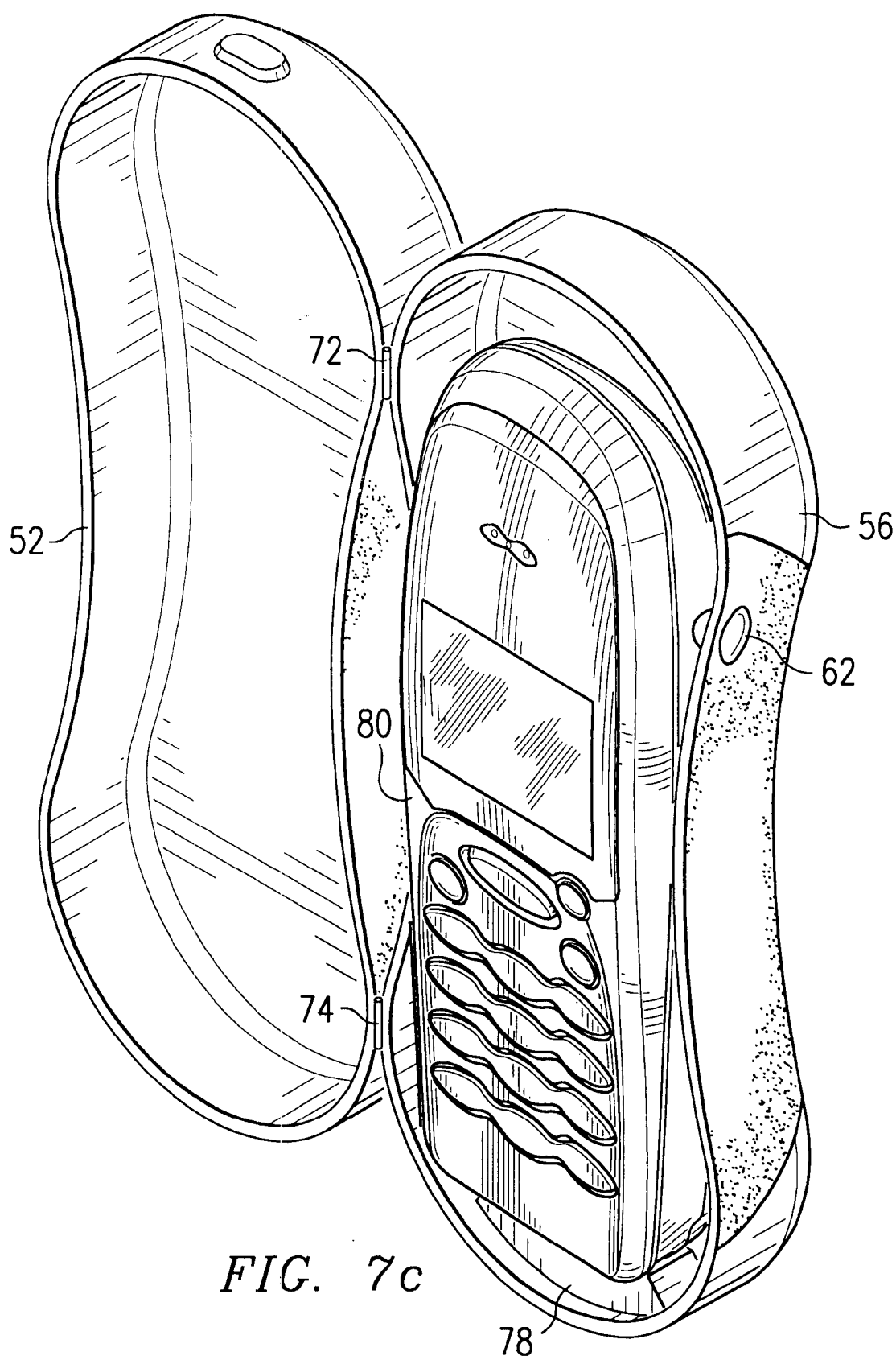
FIG. 7c is a perspective view of an open position of the enclosure of the present invention having an electronic device therein.

As an alternative embodiment of the present invention the rear portion 56 contains an antenna 76 capable of communicating with an electronic device via the connector 78 attached to the rear portion 56. FIG. 7b illustrates another embodiment of the enclosure 50 in an open position with the connector 78 attached to the front portion 52. FIG. 7c illustrates the enclosure 50 in an open position where the enclosure 50 contains a mobile terminal 80, whereby the actuator 62 is in communication with mobile terminal 80 via the connector 78.

In an exemplary operation of the invention, the mobile station 10 is enclosed in the protective enclosure 50. Upon an unsolicited activation of the mobile station 10, the user is alerted via the indicator 70. Upon the user being alerted, the user may communicate with the enclosed mobile terminal 10 by actuating the actuator 62 of the protective enclosure 50, thereby communicating with the enclosed mobile station 10 without removing the mobile station 10 from the protective enclosure 50.

It is understood that various modifications can be made to the mobile station apparatus and method of operation and remain within the scope of the present invention. For example, the protective enclosure may comprise an external or internal antenna to assist transmission and reception of wireless signals. The protective enclosure may also contain a battery pack to prolong operation of the enclosed electronic device operable in a wireless communication system.

While preferred embodiments have been discussed and illustrated above, the present invention is not limited to these descriptions or illustrations, and includes all such modifications, which fall within the scope of the invention and claim language presented below.

What is claimed is:

1. A protective enclosure for protecting an electronic device, the protective enclosure comprising:
    a housing, the housing having an open position and a closed position, such that when said housing is in said closed position, said housing encloses the electronic device;
    a connector provided on said housing, said connector communicating with the enclosed electronic device when said housing is in said closed position containing the electronic device;
    an indicator provided on said housing, said indicator for providing an alert upon an unsolicited activation of the electronic device while said housing is in said closed position enclosing the electronic device; and
    an actuator provided on said housing, said actuator communicating with the electronic device via said connector, where said actuator controls the functionality of the enclosed electronic device.

2. The protective enclosure as claimed in claim 1, wherein said housing further comprises:
    a speaker, said speaker for communicating with the enclosed electronic device.

3. The protective enclosure as claimed in claim 2, wherein said speaker is capable of providing an audio signal from the enclosed electronic device.

4. The protective enclosure as claimed in claim 1, wherein said connector is provided inside said housing.

5. The protective enclosure as claimed in claim 1, wherein an electrical connection is formed between said actuator and the electronic device via said connector.

6. The protective enclosure as claimed in clam 1, wherein a wireless connection is formed between said actuator and the electronic device via said connector.

7. The protective enclosure as claimed in claim 6, wherein said wireless connection comprises a standard defined by Bluetooth.

8. The protective enclosure as claimed in claim 1, wherein said unsolicited activation comprises an incoming call at the electronic device.

9. The protective enclosure as claimed in claim 8, wherein actuating said actuator when said incoming call is received at the electronic device, will answer said incoming call.

10. The protective enclosure as claimed in claim 9, wherein the electronic device comprises a personal digital assistant.

11. The protective enclosure as claimed in claim 9, wherein the electronic device comprises a mobile terminal.

12. The protective enclosure as claimed in claim 9, wherein said indicator comprises a Light Emitting Diode connected to the electronic device via said connector.

13. The protective enclosure as claimed in claim 12, wherein said indicator comprises intermittent illumination of said Light Emitting Diode.

14. The protective enclosure as claimed in claim 9, wherein said indicator comprises a Liquid Crystal Display connected to the electronic device via said connector on said housing.

15. The protective enclosure as claimed in claim 14, wherein said alert comprises displaying a message on said Liquid Crystal Display.

16. A protective enclosure for an electronic device operable in a wireless communication system, the protective enclosure comprising:
   a housing, said housing having at least one cover for sealing the electronic device within said housing;
   a connector provided on said housing, said connector communicating with the electronic device sealed within said housing;
   an indicator provided on said housing, said indicator providing an alert upon an unsolicited activation of the electronic device while the electronic device is sealed within said housing; and
   an actuator provided on said housing, said actuator for communicating with the electronic device via said connector, where said actuator controls the functionality of the electronic device sealed within said housing.

17. The protective enclosure as claimed in claim 16, said housing further comprising:
   a speaker, said speaker for communicating with the electronic device sealed within said housing.

18. The protective enclosure as claimed in claim 17, wherein said speaker is capable of providing an audio signal from the electronic device sealed within said housing.

19. The protective enclosure as claimed in claim 16, wherein said connector is provided inside said housing.

20. The protective enclosure as claimed in claim 16, wherein said indicator is a Light Emitting Diode connected via said connector on said housing.

21. The protective enclosure as claimed in claim 16, wherein said indicator is a Liquid Crystal Display connected via said connector on said housing.

22. The protective enclosure as claimed in claim 16, wherein an electrical connection is formed between said actuator and the electronic device via said connector.

23. The protective enclosure as claimed in clam 16, wherein a wireless connection is formed between said actuator and the electronic device via said connector.

24. The protective enclosure as claimed in claim 23, wherein said wireless connection comprises a standard defined by Bluetooth.

25. The protective enclosure as claimed in claim 16, wherein said unsolicited activation comprises an incoming call at the electronic device.

26. The protective enclosure as claimed in claim 25, wherein actuating said actuator when said incoming call is received at the electronic device, will answer said incoming call.

27. The protective enclosure as claimed in claim 16, wherein the electronic device comprises a personal digital assistant.

28. The protective enclosure as claimed in claim 16, wherein the electronic device comprises a mobile terminal.

29. A composite handset operable in a wireless communication system, the composite handset comprising:
   an electronic device;
   a housing, said housing having an open position and a closed position, such that when the housing is in said closed position said housing encloses said electronic device;
   a connector provided on said housing, said connector communicating with said electronic device when said housing is in said closed position containing said electronic device;
   an indicator provided on said housing, said indicator providing an alert upon an unsolicited activation of said electronic device while said housing is in said closed position enclosing said electronic device; and
   an actuator provided on said housing, said actuator for communicating with said electronic device via said connector, where said actuator controls the functionality of said enclosed electronic device.

30. The composite handset as claimed in claim 29, said housing further comprising:
   a speaker, said speaker for communicating with said enclosed electronic device.

31. The composite handset as claimed in claim 30, wherein said speaker is for providing an audio signal from said enclosed electronic device.

32. The protective enclosure as claimed in claim 29, wherein said connector is provided inside said housing.

33. The protective enclosure as claimed in claim 29, wherein said indicator is a Light Emitting Diode connected via said connector on said housing.

34. The protective enclosure as claimed in claim 29, wherein said indicator is a Liquid Crystal Display connected via said connector on said housing.

35. The protective enclosure as claimed in claim 29, wherein an electrical connection is formed between said actuator and said electronic device via said connector.

36. The protective enclosure as claimed in clam 29, wherein a wireless connection is formed between said actuator and said electronic device via said connector.

37. The protective enclosure as claimed in claim 36, wherein said wireless connection comprises a standard defined by Bluetooth.

38. A protective enclosure for protecting an electronic device, the protective enclosure comprising:
   a housing, said housing having an open position and a closed position, such that when said housing is in said closed position, said housing encloses the electronic device;

a connector provided on said housing, said connector communicating with the enclosed electronic device when said housing is in said closed position containing the electronic device;

an indicator provided on said housing, said indicator providing an alert upon an unsolicited activation of the electronic device while said housing is in said closed position enclosing the electronic device; and an actuator area provided on said housing, said actuator area in communication with the electronic device via said connector, where said actuator area controls the functionality of the enclosed electronic device.

* * * * *